United States Patent [19]
Sarin

[11] Patent Number: 5,838,947
[45] Date of Patent: Nov. 17, 1998

[54] MODELING, CHARACTERIZATION AND SIMULATION OF INTEGRATED CIRCUIT POWER BEHAVIOR

[75] Inventor: Harish K. Sarin, Fremont, Calif.

[73] Assignee: Synopsys, Inc., Mountain View, Calif.

[21] Appl. No.: 633,836

[22] Filed: Apr. 2, 1996

[51] Int. Cl.$^6$ ................................................ G06F 9/455
[52] U.S. Cl. ......................................................... 395/500
[58] Field of Search .................... 395/500; 364/478–491, 364/578

[56] References Cited

U.S. PATENT DOCUMENTS

| | | | |
|---|---|---|---|
| 4,907,180 | 3/1990 | Smith et al. | 364/578 |
| 5,119,312 | 6/1992 | Gröger et al. | 364/483 |
| 5,446,676 | 8/1995 | Huang et al. | 364/578 |
| 5,473,548 | 12/1995 | Omori et al. | 364/483 |
| 5,481,469 | 1/1996 | Brasen et al. | 364/483 |
| 5,521,834 | 5/1996 | Crafts et al. | 364/489 |
| 5,535,370 | 7/1996 | Raman et al. | 395/500 |
| 5,553,008 | 9/1996 | Huang et al. | 364/578 |
| 5,559,715 | 9/1996 | Misheloft | 364/488 |
| 5,612,636 | 3/1997 | Ko | 324/83 |
| 5,625,803 | 4/1997 | McNelly et al. | 395/500 |

*Primary Examiner*—Kevin J. Teska
*Assistant Examiner*—Dan Fiul
*Attorney, Agent, or Firm*—Townsend and Townsend and Crew LLP

[57] ABSTRACT

A method for accurately and efficiently simulating power behavior of digital VLSI MOS circuit at the gate-level. The method characterizes both the static and dynamic power consumed by a cell for different logic state conditions on all its ports. For each state-vector, power-consumption measurements are carried out for different conditions of input ramp and output load. The method looks at the power behavior of each state-vector for different values of input ramp and output loads as allowed by the technology of that cell. The exhibited power behavior is then modeled in terms of power-coefficients of the power dissipation model. These power-coefficients, which are determined by the characterizer, provide a mechanism to capture the different power consumption dependencies under varying state-vector conditions, input ramp, and output load for different types of cells. The model is unique as it has the same form for all cells, but its coefficients are customizable for each power vs. input-ramp vs. output load dependency, thereby allowing the exact modeling of the complexities exhibited by the power behavior of different state-vectors for the different cells. These coefficients are used during simulation to compute the power consumed by the cell under the applicable state-vector and circuit-conditions to which each cell instance is subjected in the circuit.

20 Claims, 10 Drawing Sheets

| CIRCUIT | VERILOG | PwG | HSPICE |
|---|---|---|---|
| ASYNCHRONOUS | comp+link+sim | comp+link+sim | |
| COUNTER | 0.5+0.3+0.0 SEC. | 0.5+0.3+0.0 SEC. | 167.10 CPU SEC |

NUMBER OF ACCELERATED SIMULATION EVENTS: 86
NUMBER OF TIMING CHECK EVENTS: 335

| | ENERGY DISSIPATED (pJ) | |
|---|---|---|
| SIMULATION INTERVAL (nS): | HSPICE | PwG |
| 0–40 | 8.20e–3 | 9.40e–3 |
| 40–100 | 18.21e–3 | 17.95e–3 |
| 100–140 | 16.03e–3 | 14.63e–3 |
| TOTAL ENERGY DISSIPATED | 42.44e–3 | 41.97e–3 |
| PERCENTAGE ACCURACY RELATIVE TO HSPICE = 1.1% | | |

*FIG. 11*

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| CIRCUIT | EQUIV GATE COUNT | VEC (n) | #EVENTS (MILLION) | PURE VERILOG TIME (MIN) | PURE VERILOG MEM (MB) | VERILOG WITH VCD DUMP TIME (MIN) | VERILOG WITH VCD DUMP MEM (MB) | VERILOG WITH VCD DUMP DISK (MB) | PwG TIME (MIN) | PwG MEM (MB) | PwG DISK (MB) (**) | SPEED LOSS VCD VS VERILOG (%) | SPEED LOSS PwG VS VERILOG (%) |
| IIR2 | 8.5K | 10 | 1.5 | 0.33 | 3.9 | 0.43 | 4.7 | 1.2 | 0.35 | 4.1 | 0.36 | 33.3 | 8.7 |
|  |  | 100 | 14.2 | 2.65 | 4.1 | 3.5 | 5.0 | 11.1 | 2.9 | 4.3 | 3.4 | 32.1 | 9.4 |
|  |  | 1000 | 140 | 26.0 | 4.2 | 34.2 | 5.1 | 114 | 28.4 | 4.6 | 34.0 | 31.5 | 9.2 |
|  |  | 10000 | 1410 | 54.0 | 4.4 | 71.5 | 5.3 | 241 | 66.7 | 4.8 | 70.9 | 32.4 | 23.5 |
| FPU | 10K | 8000 | 13.2 | 1.85 | 6.6 | 3.3 | 7.9 | 34.9 | 2.1 | 6.8 | 15.1 | 78.4 | 13.5 |
| PAC1 | 29K | 45 | 0.4 | 1.56 | 8.9 | 1.6 | 10.7 | 2.5 | 1.6 | 8.9 | 0.4 | 2.5 | 2.6 |
| PAC2 | 58K | 45 | 0.8 | 6.4 | 9.8 | 7.2 | 12.3 | 5.4 | 6.6 | 10.1 | 0.9 | 12.5 | 3.1 |
| PAC3 | 115K | 45 | 1.6 | 23.8 | 10.8 | 25.0 | 13.0 | 10.6 | 24.1 | 11.4 | 7.2 | 5.0 | 1.2 |
| PAC4 | 231K | 45 | 3.1 | 90.9 | 12.4 | 91.8 | 14.9 | 72.3 | 91.6 | 13.0 | 3.5 | 1 | 1 |

** INCLUDING INTERMEDIATE FILE FOR GENERATION OF WAVEFORMS
VERILOG VERSION: VERILOG-XL 2.2.1
HARDWARE CONFIGUREATION OF SERVER: MEMORY: 504 MB SWAP: 1752M

FIG. 12

MODELING, CHARACTERIZATION AND SIMULATION OF INTEGRATED CIRCUIT POWER BEHAVIOR

BACKGROUND OF THE INVENTION

This invention relates to computer-aided design (CAD) tools for analyzing integrated circuits. In particular, the invention provides a method for modeling, characterizing and simulating the power behavior of VLSI MOS circuits.

An important consideration in VLSI MOS circuit design is reduction of on-chip power consumption. Various design techniques can be used to reduce power consumption on a chip, however, a designer first needs accurate information regarding the dynamic and static power consumption of the circuit under realistic operating conditions. Accurate modeling and characterization of power behavior can aid the designer in predicting battery and chip life, selecting proper packaging, and compensating for thermal effects. In addition, before the layout phase, such information can be used to produce macro-cell power information, which is useful during the layout phase in balancing the total power consumption on a chip to meet power specifications. After the layout phase, the information can further be used to calculate power consumption with back-annotated delays and actual wire-loads. Due to the number of iterations involved in a design cycle, having such power information will contribute to greater design cycle efficiency.

Power is dissipated in a circuit whenever a cell instance switches a signal from one voltage level to another. This switch in voltage level causes charging or discharging of capacitances which include pin capacitances, interconnect capacitances, and transistor capacitances (e.g., coupling capacitances distributed between the gate and source/drain terminals). Overshooting/undershooting of output signals, known as capacitive feedthrough effects, also impact power loss. In addition, due to level shifters, leakage currents, pullups and pulldowns, power also dissipates statically when the circuit is in quiescent mode. Hence, in order to depict an accurate picture of the power behavior, factors such as the signal frequency, the amount of capacitance driven by each pin, the input slew rate, and output loading should be taken into account.

In the past, simple power consumption models which consider only the charging or discharging of the gate output capacitance have been used. However, these methods ignore the power consumption of the internal nodes of the gate. Among the factors omitted from consideration is the coupling capacitance between the gate-to-source junction and the gate-to-drain junction. Also omitted are the input slew-rate (which needs to be considered as power behavior is different in the slow and fast regions due to short circuit current effects), and the input signal transitions, which could cause signal overshoots or undershoots in the output and internal nodes thereby affecting power consumption. Also, these methods ignore the power loss due to glitches both at the internal node of the cell, as well as glitches on the interconnect due to timing hazards.

Furthermore, as VLSI MOS circuit design progress into the deep sub-micron geometries, the effects of interconnect delays play a larger part in power consumption calculation. To accurately calculate power behavior at this level, it is necessary to model the large coupling capacitances as well as the metal resistances. In addition, technology-specific dependencies should be accounted for. Such dependencies include sensitivity to the slope of the rise-fall curve and the gate-loads, temperature effects, voltage and process variations, feedthrough effects, channel length modulation, carrier velocity saturation, depletion charge sharing and sub-threshold conduction by source and drain.

In the move to deep sub-micron, the number of parameters needed to accurately model power behavior of a transistor has increased exponentially, ranging from fewer than 50 parameters at 1 micron to more than 1000 parameters at 0.5 micron. The simple transistor models used in the past cannot account for this type of complexity. Hence, new methods for modeling and characterizing power behavior for sub-micron process technologies are needed.

SUMMARY OF THE INVENTION

The present invention provides a method for accurately and efficiently simulating power behavior of digital VLSI MOS circuit at the gate-level. The method characterizes both the static and dynamic power consumed by a cell for different logic state conditions on all its ports. The correlation of logic states on all ports of a cell is called the state-vector, and the logic states allowed on each port are determined by the logic functionality of that cell. For each state-vector, power-consumption measurements are carried out for different conditions of input ramp and output load. For cells with a large number of inputs, the number of state-vectors may be substantial. Since the power consumed by certain state-vectors may be negligible, to achieve further efficiency while ensuring accuracy, the power consumption measurement of the state-vectors are compared to a user specified power value. A state-vector will be dropped from further consideration if its power consumption is less than the user specified power value.

The power consumed by a cell varies with input ramp and output load for a given state-vector, and this behavior is found to vary with different cells, as well as with different state-vectors for the same cell. The method according to the present invention looks at the power behavior of each state-vector for different values of input ramp and output loads as allowed by the technology of that cell. The exhibited power behavior is then modeled in terms of power-coefficients of the power dissipation model according to the present invention. These power-coefficients, which are determined by the characterizer of the present invention, provide a mechanism to capture the different power consumption dependencies under varying state-vector conditions, input ramp, and output load for different types of cells. The model according to the present invention is unique as it has the same form for all cells, but its coefficients are customizable for each power vs. input-ramp vs. output load dependency, thereby allowing the exact modeling of the complexities exhibited by the power behavior of different state-vectors for the different cells. These coefficients are used during simulation to compute the power consumed by the cell under the applicable state-vector and circuit-conditions to which each cell instance is subjected in the circuit.

Anomalous variations in power behavior are generally caused by various non-linear effects including those due to short-circuit currents, internal node-glitching, internal parasitics, and deep-submicron effects such as channel-length modulation, carrier mobility saturation, and the like. Modeling all these phenomena analytically is not possible. However, the method according to the present invention attempts to model all these effects exactly, hence enabling the accurate capture of the power behavior exhibited by the different types of cells and gates such as tri-state devices, flip-flops, single and multi-stage cells, memories, I/O pads exhibiting pullup/pulldown phenomena, and the like.

In a preferred embodiment, a system of the present invention uses a power characterizer, a power dissipation model and a power simulation engine. The characterizer consolidates all information pertinent for calculating power. This information is then condensed into power coefficients according to the power dissipation model, and the simulation engine applies the power coefficients to each cell in an actual circuit to calculate power consumed by the circuit.

In one aspect of the present invention, a method of simulating power behavior for a circuit includes the steps of: compiling logic and transistor level descriptions of a cell; running a transistor level simulator to generate power coefficients corresponding to each state vector that results from allowed combinations of logic-states on the ports of the cell; consolidating the power coefficients into a power object, which also incorporates a mechanism, during simulation, of matching resultant logic state-vectors (called SDDL—State Dependent Decision Logic) with the state vectors which have been characterized and the cell logic attributes (for e.g., pin-to-pin timing arcs, delay per unit load, input-pin capacitance, etc.), or in the event that no match is found, a default power consumption value is assigned; creating a power object file in machine-independent format for each cell in a library, so that the power object is accessible on different types of platforms (for a cell library, all the power objects are consolidated into a power-object library file); attaching a power object to each instance based on the cell-type name during loading of a netlist in the power simulator; accessing the power object with a procedural interface during power simulation; calculating power consumption of the cell based on static and dynamic events within the circuit from the power object; and reporting the power consumption value calculated.

Other features and advantages of the present invention will become apparent upon a perusal of the remaining portions of the specification and drawings. In the drawings, like reference numerals indicate identical or functionally similar elements.

BRIEF DESCRIPTION OF THE DRAWINGS

FIG. 11 is a chart showing the accuracy, and simulation run-time for PowerGate (the system according to the present invention) and HSPICE in calculating the power consumption of an asynchronous counter; and FIG. 12 is a table showing that PowerGate and Verilog have comparable simulation run-time, memory requirement, and disk space requirement for circuits of various sizes (ranging from circuits with 8.5K to 231K equivalent gates), though PowerGate has the additional burden of calculating power consumption.

DETAILED DESCRIPTION OF THE INVENTION

I. Introduction

Figure 1:
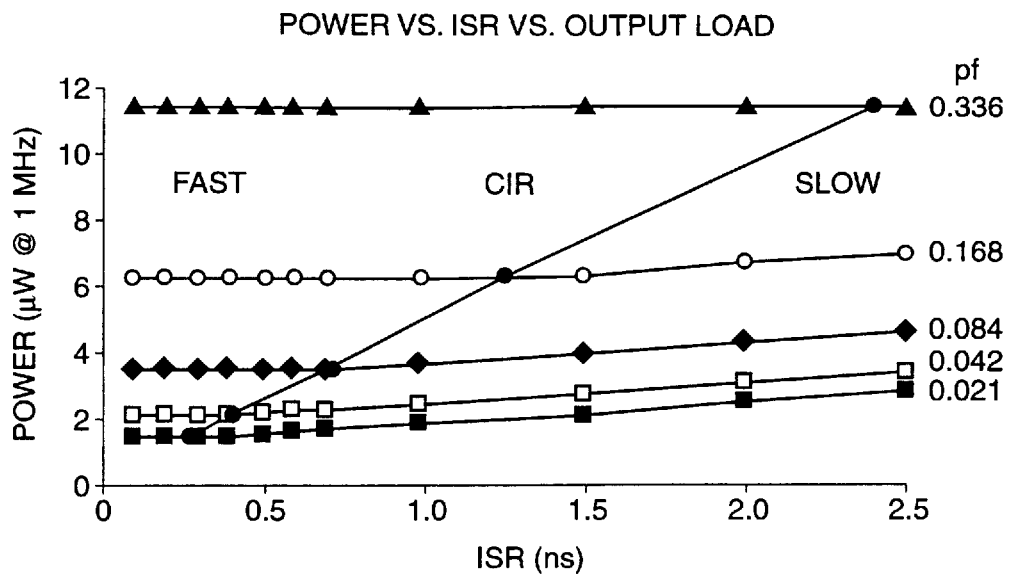
FIG. 1 shows the power behavior of an inverter undergoing output rising transition.

As VLSI MOS circuit design progress into the sub-micron geometries, more circuit parameters need to be accounted for to accurately depict power behavior. Various methods have been developed to address this concern. For sub-micron process technologies, the present state of the art for modeling, characterizing, and simulating power behavior is typically as described in one of the following three ways.

The first approach utilizes the probabilistic and toggle methods, which estimate power by the activities within the internal nodes of a network when given the distribution of the input signals. The signal probability of each node in the network is calculated and the total average capacitance $C_{avg}$ is then estimated from the summation as represented by $\Sigma p_{io}(1-p_{io})C_i$, where $P_{io}$ is the probability that node i will be in state 0, and $C_i$ is the physical capacitance associated with node i. The total power is then $C_{avg}{}^{*}V^{2*}f_{clk}$, where V is the voltage swing, and $f$ is the logic state switching rate (i.e., the toggle frequency). Probabilistic simulations generally consider the signal behavior at the circuit inputs as probability waveforms, which are propagated in the circuit using event-driven logic simulation with an assignable delay. This approach is efficient, however, the event-driven algorithm deals with the probability of making a transition rather than the actual transition itself.

Furthermore, probabilistic techniques make the following assumptions: 1) The power supply and ground voltage levels are fixed, which means the voltage drop across the interconnect and power deration due to changing baseline conditions cannot be accounted for. 2) The circuit consists of logic gates and latches only, thereby ignoring tri-state devices, pull-up/pull-down resistors or floating of outputs. 3) The circuit draws no steady-state currents, thereby ignoring the source and drain leakage across the p-n junctions and other diffusion currents. 4) Glitching is also ignored since the timing relationships between the signals cannot be adequately accounted for. This is problematic as glitching can consume a significant amount of power. 5) Spatial and temporal independence is assumed, while in actuality, circuit inputs and internal nodes are correlated. 6) Input slew rate is ignored, hence short-circuit power component is not accounted for. 7) Finally, though the approach is regarded as pattern-independent, in practice, one provides the direct input probabilities. Hence, the results of the analysis depend largely upon the supplied probabilities, moreover, only the typical behavior is considered.

The second approach is a transistor-based approach, which utilizes methods based on the direct calculation of the transistor equation solutions. These methods simulate and analyze electronic circuits timing behavior and power consumption by accepting a transistor-level netlist defining the circuits, and a technology file containing transistor characteristics, including voltage-current arrays and piecewise linear transistor approximation created therefrom. Static channel connected components are constructed and evaluated by calculating the solution of circuit equations. The values of the node voltages and element currents, which represent a detailed simulated current response, are also calculated.

In general, this approach provides a fairly accurate timing and power simulation tool for efficient analysis of integrated IC designs. However, being a transistor-level tool, as the number of gates on an IC increases, this approach will suffer from severe memory and execution time constraints, making it unsuitable for large cell-based designs. Furthermore, by working only with the transistor-level netlists, the designer receives no help in floor-planning and layout activities. Finally, this approach does not take into account deration of power due to changing baseline conditions. Consideration of power deration under this approach would require exhaustive re-simulation of large circuits, thereby rendering the approach cost-ineffective for this purpose.

The third approach utilizes gate-level methods, which raise the level of abstraction for power estimation from the transistor-level to the logic-level. One recent method based on the gate-level approach assumes that the power dissipation behavior of a logic gate exhibits two modes of operation (a two-segmented-linear model). In the "fast" mode, power dissipation for a fixed output load is relatively independent of the input slew rate (ISR). In the "slow" mode, the power dissipation behavior for a fixed output load increases for an increasing slew rate. As shown in FIG. 1, the critical input ramp (CIR) line separating the two regions is assumed to be a linear function of the output load. The fast ramp region function is presumed to equal the slow ramp region function at the boundary between the regions as defined by the CIR line.

Figure 2:
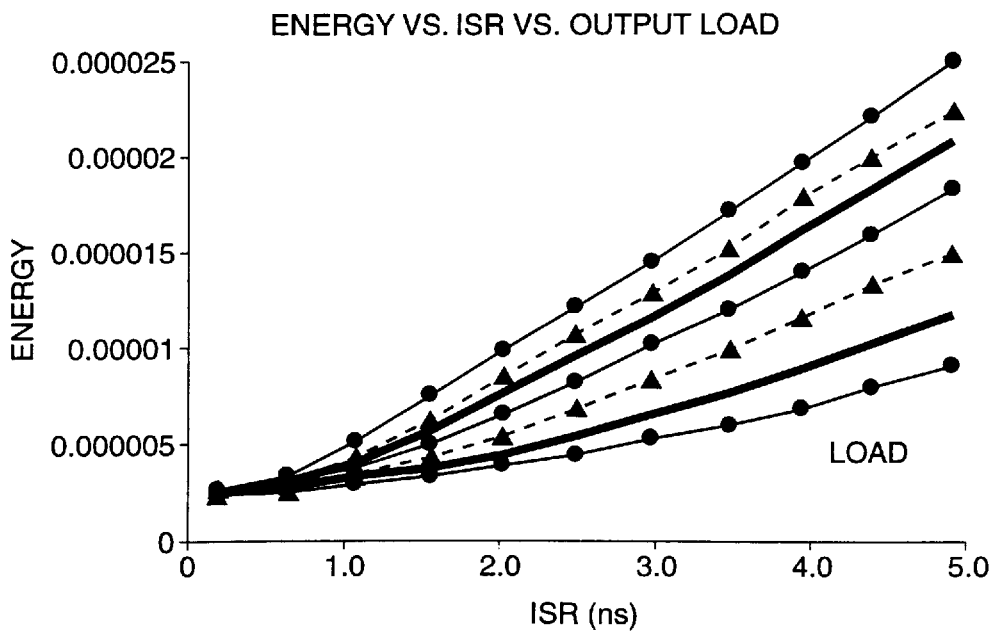
FIG. 2 shows the power behavior of an inverter undergoing output falling transition.

Although this approach is a logical first step, it suffers from an oversimplified power dissipation model that ignores observed complexities and anomalies in the power behavior of the various cells under different circuit conditions. A further study of the behavior of different types of cells, and the same cell under different state-conditions shows that the two-segmented-linear power model is widely inapplicable. Referring to FIG. 1, the power behavior of an inverter undergoing output rising transition is shown to be consistent with the two-segmented-linear model behavior. However, referring to FIG. 2, the same inverter undergoing output falling transition has a power behavior which contradicts the two-segmented-linear behavior. This is because power behavior, unlike timing behavior, is strongly state-dependent. It is common for cells to exhibit different power vs. input ramp vs. output load behavior under different state-vector conditions.

Figure 3A:
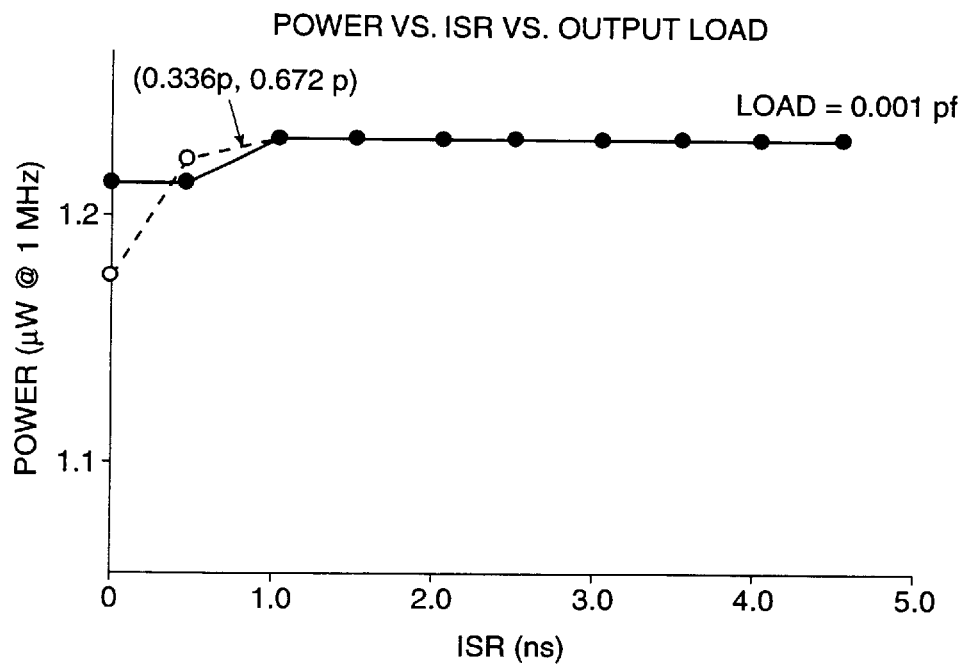
FIG. 3A shows the power behavior of an AND-OR-INVERT cell undergoing output rising transition.
Figure 3B:
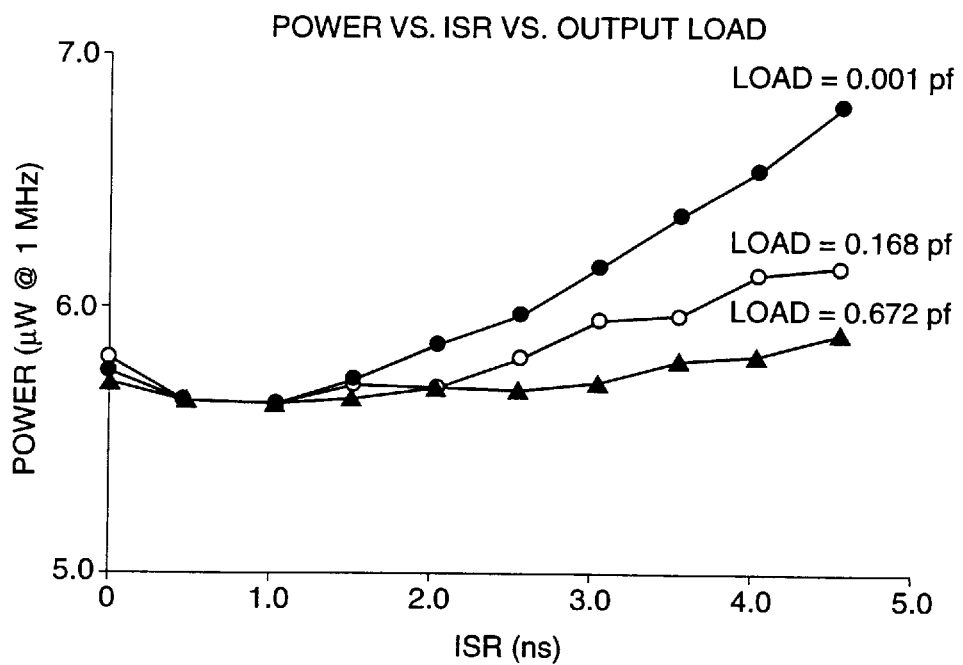
FIG. 3B shows the power behavior of an AND-OR-INVERT cell undergoing output falling transition.
Figure 4:
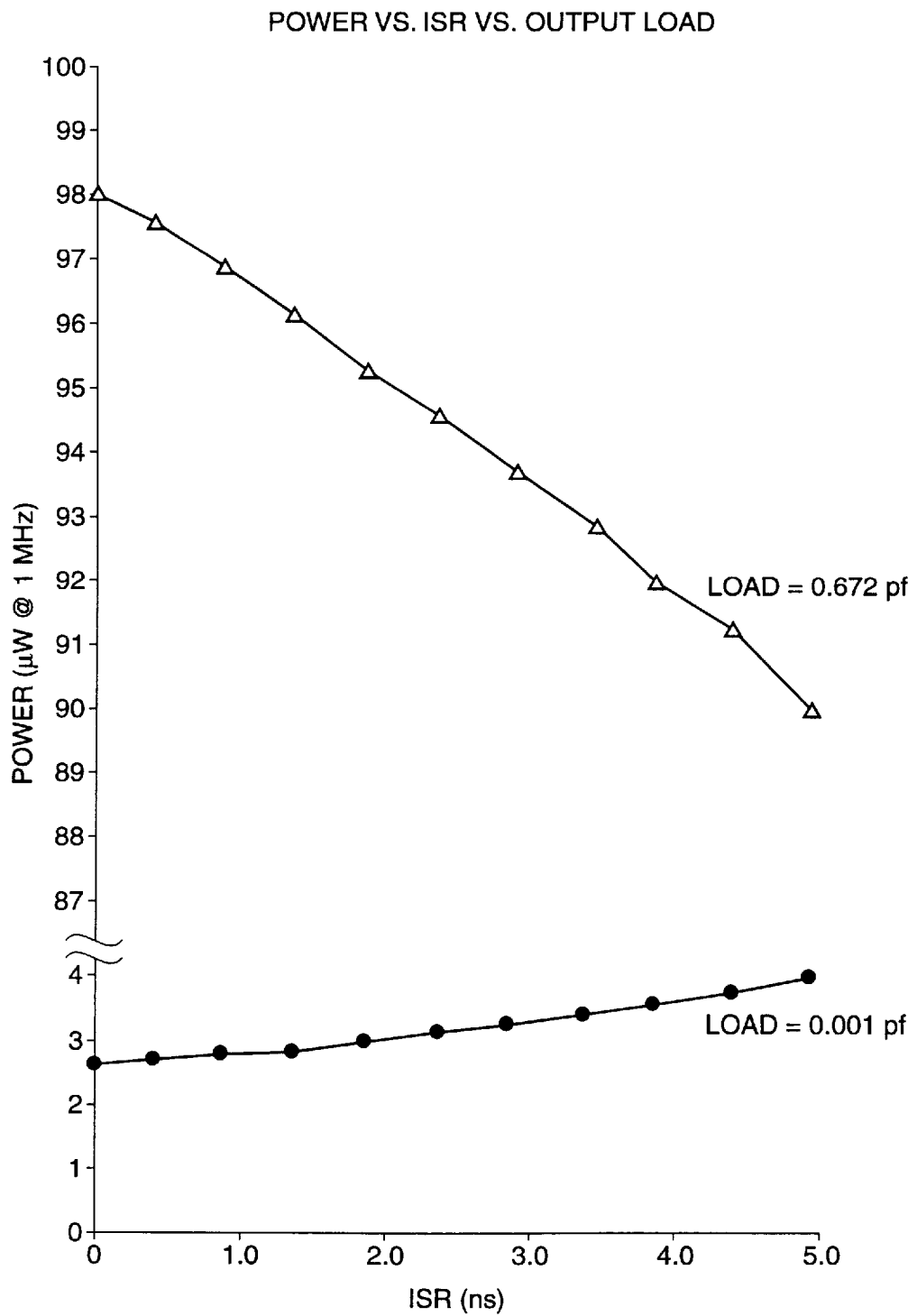
FIG. 4 shows the power behavior of a 2-INPUT- XOR under the same state-vector condition, as shown, the power behavior is different in different load regions.

FIGS. 3A & 3B depict other exceptions to the two-segmented-linear model. FIG. 3A shows the behavior for an AND-OR-INVERT cell under output rising transition. As can be seen, the ramp is almost independent of the load. FIG. 3B shows the same AND-OR-INVERT cell under output falling transition. Here, the cell behavior is such that the supply current decreases with increasing load. As shown by FIGS. 3A & 3B, the power behavior for an AND-OR-INVERT cell is neither linear, nor is it the same for different state vectors. In addition, certain cells exhibit a change in their power vs. ramp slope for different load regions. FIG. 4 illustrates this type of anomaly. The effect of this type of anomalous power behavior is sizable and cannot be ignored.

Furthermore, as more drive stages are interposed between the input and output of a logic cell, the output begins to decouple from the input. At a certain critical number of intervening stages, the fast and slow ramp regions previously mentioned coalesce into a single region. Under the two-segmented-linear approach, no effort is taken to determine the critical number of intervening stages at which this coalescence occur. The two-segmented-linear power model also does not account for higher order non-linearities. Furthermore, the pin-to-pin timing arcs of the cells are determined statically. For each cell, the approach assumes one of several values possible (usually the worst pin-to-pin arc value is used), instead of dynamically determining the arc value according to actual timing transitions.

Finally, the above mentioned approach enforces a specific timing model. This is because the CIR for a logic cell's power dissipation profile is assumed to be identical to the CIR for the timing behavior of the logic cell. Since the CIR for the timing behavior is dependent on the specific timing model, this approach requires timing characterization according to the specific timing model, as well as power characterization for each cell. No justification is given for the above assumption, and experimentation shows that the CIR may or may not exist. By relying on the CIR for power profile, this approach is restricted in applicability to the users of this specific timing model. This is undesirable as individual vendors have typically spent much effort to develop and optimize their own timing model, which is likely different from the timing model corresponding to the power profile CIR.

In general, this approach suffers from an oversimplification of power behavior, since experiment observations show several types of power behavior complexities that are not covered by the power model. Moreover, the characterization efficiency achieved through the simplified power model is inaccessible to users who do not have libraries characterized with the specific timing model assumed by the power model. Therefore, though characterization efficiency appears to be achieved, the efficiency is impractical, furthermore, the characterization is inaccurate.

In summary, previous approaches for modeling and characterizing power behavior suffer from a variety of drawbacks including the consideration of only a limited number of parameters, invalid circuit condition assumptions, and inaccurate linear assumptions. The detrimental effect of these drawbacks is enhanced when these methods are applied to deep sub-micron semiconductor circuit with over one million transistors, where speed and memory requirements become as important as accuracy considerations.

Accordingly, the present invention provides a new approach for characterizing and modeling power behavior of highly dense circuits. The approach accurately and efficiently depicts power behavior, thereby allowing for easier optimization of power consumption within the circuit. In preferred embodiments, power behavior anomalies will be taken into account without sacrificing simulation run time efficiency.

II. Description of Preferred Embodiments

Figure 5:
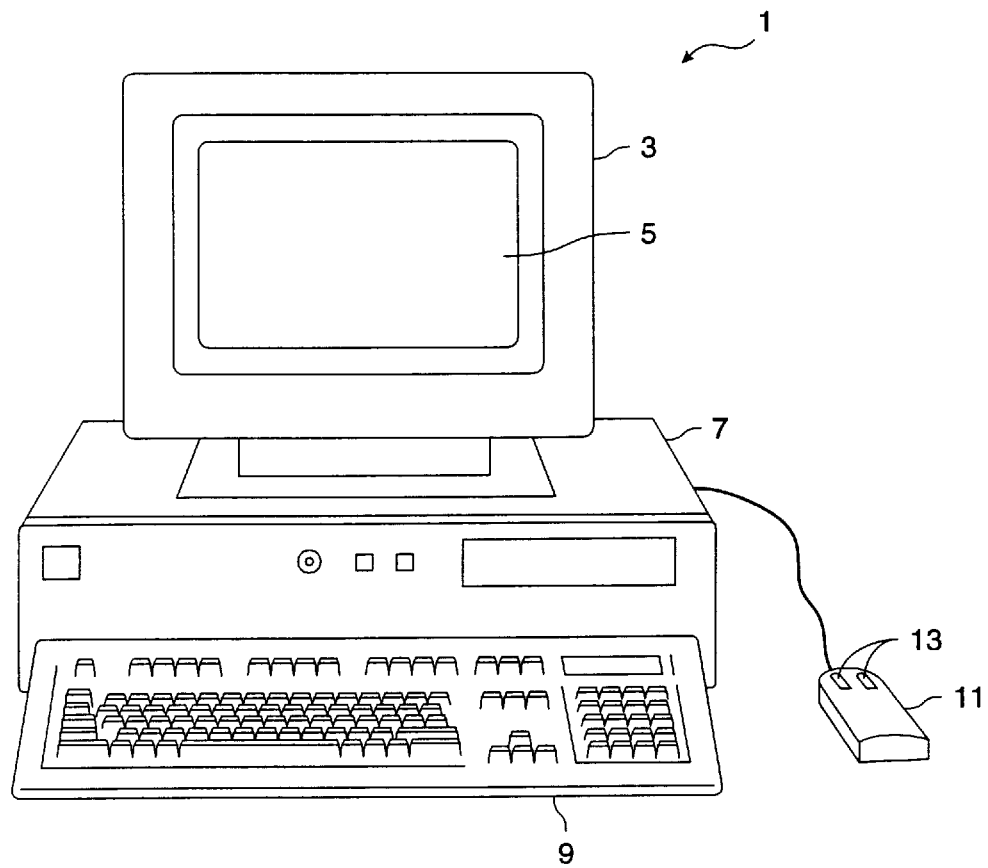
FIG. 5 is an illustration of computer hardware suitable for implementing the present invention.

FIG. 5 is an illustration of computer hardware suitable for implementing the present invention. FIG. 5 includes a power system 1 having monitor 3, display screen 5, housing 7, keyboard 9 and mouse 11. Mouse 11 may have one or more mouse buttons such as button 13. Housing 7 encloses typical computer components such as a processor, memory, disk drives and peripheral interface adapter (not shown).

Power system 1 is shown embodied in one type of computer system. The particular computer system shown is representative only. It will be readily apparent to one of ordinary skill in the art that many types of computer hardware and configurations of the hardware are suitable for use in conjunction with the present invention. Furthermore, the computer hardware could be on a network or a distributed system.

Figure 6:
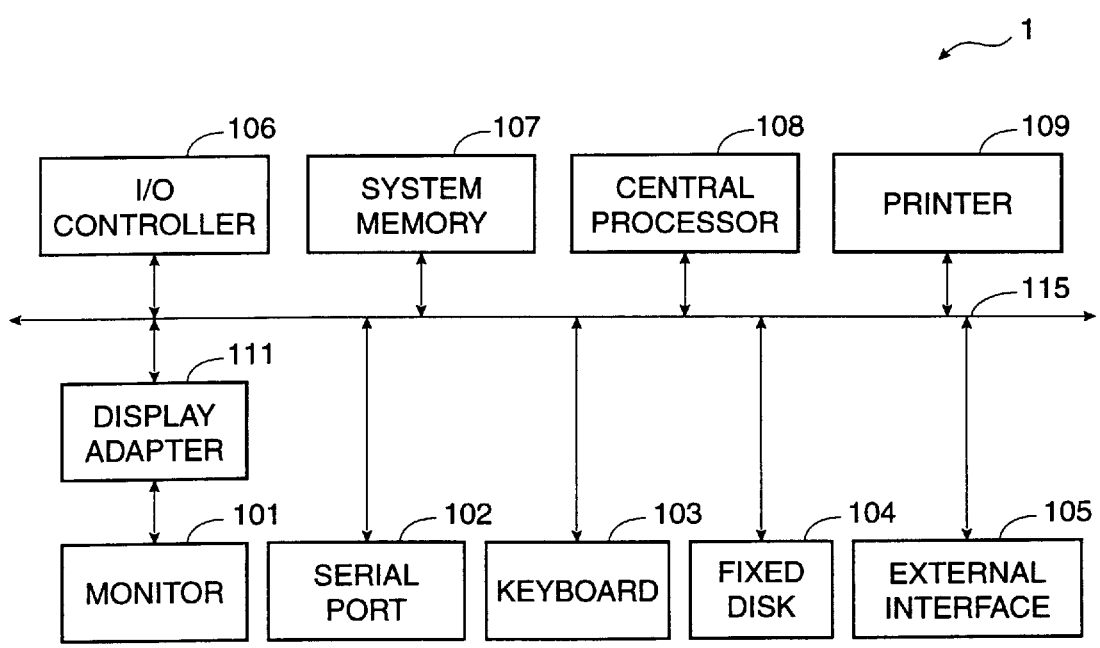
FIG. 6 is a power system for implementing power modeling, characterization, and simulation on a computer system.

FIG. 6 is a power system 1 for implementing the power modeling and characterization method according to the present invention. Power system 1 includes a central processor 108, a system memory 107, an input device, for example a keyboard 103, a fixed disk 104, a monitor 101, an external interface 105, a printer 109, an input/output (I/O) controller 106, a communications port 102, and a display adapter 111. A system bus 115 connects the components of computer system 150, providing a link among them. The keyboard 103 is a data entry device with which a user interacts with power system 1.

A preferred embodiment of the invention is written using the "C" language, and runs on UNIX™-based engineering workstations such as SUN4, IBM RS6000, HP 700 series, and DECStations. Conforming to the ANSI standard on the "C" language, it can be readily re-hosted on any UNIX-based computers with a standard "C" compiler. Computer readable media such as the system memory or the fixed disk may be utilized to store computer programs incorporating computer code that implements the present invention.

It will also be apparent to those of skill in the art that power system 1 could be readily applied on any one of a variety of workstations in any one of a variety of programming languages without departing from the scope of the invention. The above-described hardware/language are merely illustrative.

Figure 7:
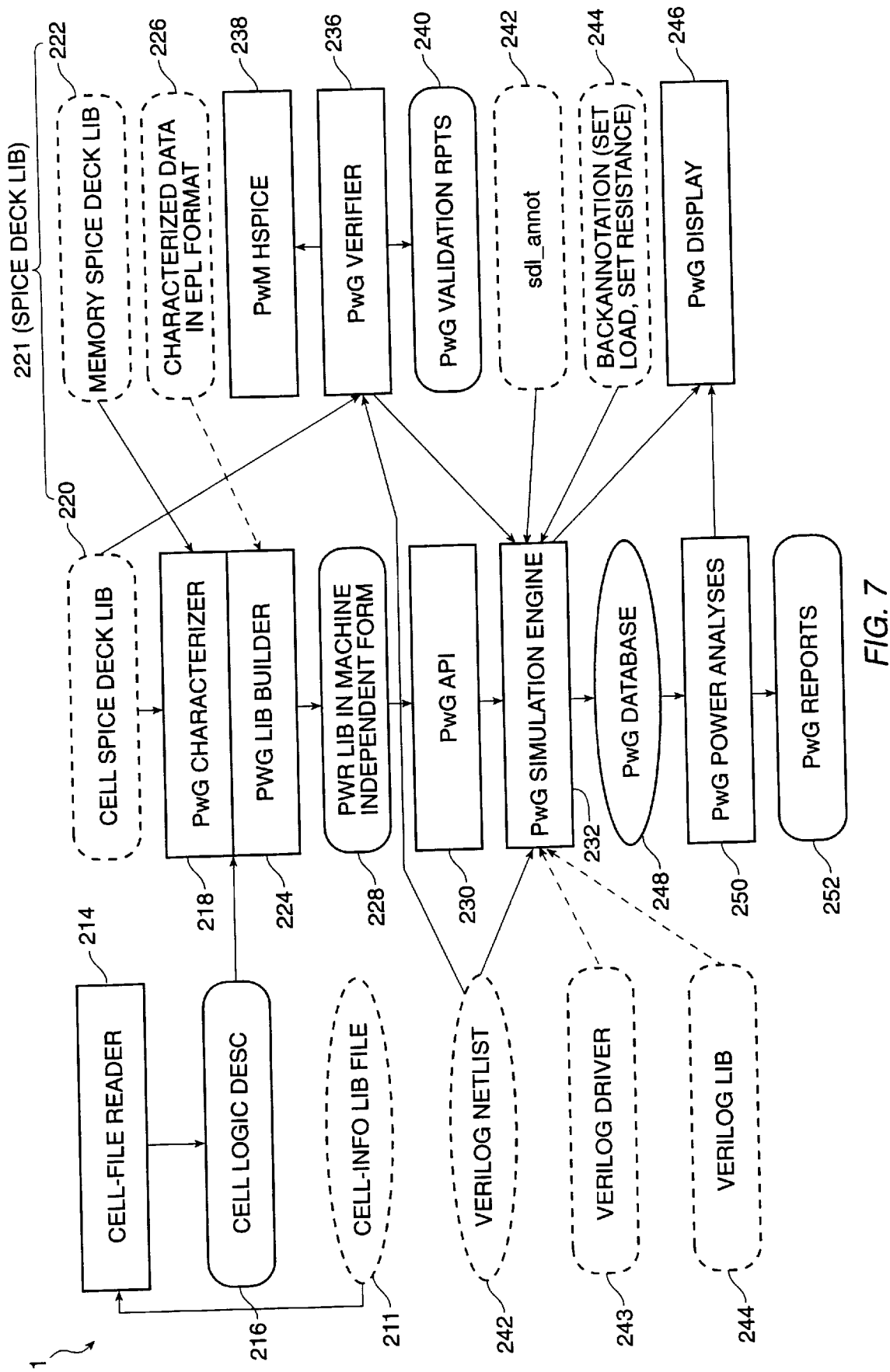
FIG. 7 is a flowchart describing operation of a preferred system for modeling, characterizing, and simulating power according to the present invention.

FIG. 7 illustrates a top level flow chart of a preferred system for modeling, characterizing, and simulating power behavior according to the present invention. Referring to FIGS. 7–10, functions enclosed within dotted lines apply if the user invokes the function, or supplies the information. As shown, power system 1 receives logic information stored in "Cell-info Lib file" 211. Lib file 211 contains logic information including timing attributes, pin-to-pin timing arcs, pin capacitances and delay resistance for each of the cells. The "Cell-file Reader" 214 reads these information from Lib file 211 and stores them in "Cell logic desc" 216, which contains descriptions of the logic behavior of each of the cells. These logic descriptions are in turn supplied to "PwG Characterizer" 218 (PwG being the abbreviated form of PowerGate, which is the system according to the present invention).

Characterizer 218 creates analog waveforms based on the description of the logic behavior of the cell and invokes SPICE, which generates the different states and measures the power for each state-vector of the cell under the entire range of ramp and load conditions for each of the state-vectors, thereby developing the power coefficients. Since power for a state-vector was measured for the different ramp and loads, state dependencies and power anomalies are accounted for. Power characterization efficiency is achieved by judicious selection of different ,m ramp and load points in order to capture the various anomalies in the power behavior for the different input ramp and external load conditions. It should be noted that though SPICE is used in the preferred method, other transistor level simulators may also be utilized.

As indicated by the dotted lines enclosing "Cell Spice Deck Lib" 220, and "memory Spice Deck Lib" 222, SPICE is not invoked in every power simulation execution. Generally, in simulations requiring characterization of data, SPICE will be called. However, a user may supply his/her own characterized data directly to PowerGate Library Builder 224, thereby eliminating the need for characterizer 218 to characterize the data. In a preferred embodiment, the user can supply raw power data (measured with SPICE or other transistor level simulator) in Epic Programming Language (EPL) format to system 1, or system 1 can provide for conversion of the data to this format. In addition, to ensure accuracy of the simulation, the user supplied data 226 should cover all the logic states of the cells involved.

Library builder 224 will take either data generated by characterizer 218 or characterized data supplied by the user 226, and generate power objects from these characterized data. The power object for each cell is generated by consolidating the state-dependent decision logic, the power coefficients for each state vector, and a mechanism for identifying the set of power coefficients that correspond to the resulting logic states on all ports of a cell instance on which an event has matured. History of each port in every cell instance is thus taken into account wherever applicable. Library builder 224 will further convert the generated power object information into machine independent binary form and store the information in power library 228.

"PwG API" 230 is a procedural interface which when invoked, supplies power object information to "PwG Simulation Engine" 232. Hence, simulation engine 232 need not read the entire power library file to access the power object information desired, thereby achieving better efficiency for the simulation process. The power object information stored in power library 228 will be sent to "PwG Verifier" 236, which will compare the power object information with those generated by "PwM HSPICE" 238. The accuracy of the power objects derived from the characterized data will be tested against power values generated by HSPICE, and reports comparing the values will be generated and sent to "PwG Validation Rpts" 240. A copy of the report comparing the values will also be sent to simulation engine 232, to provide engine 232 with information regarding the validity of the power object data it is using to calculate power. Upon receiving reassurance from verifier 236 that the power object information is valid, engine 232 will proceed with the power calculation.

If the user wishes to run Verilog, "Verilog Netlist" 242, "Verilog Driver" 243, and "Verilog Lib" 244 (which is a collection of Verilog models) will be utilized, and information regarding the way the cells are connected is thereby supplied to engine 232. Engine 232 will calculate the power consumed by the unconnected cell based on the power object information while waiting for Verilog to create the events. When the events have taken place, engine 232 will calculate the power associated with the event based on the power object information of the cell and the way the cell is connected. In addition, after layout has completed, function "sdf_annot" 242 may be called by engine 232 to take into account the effect of back annotation on pin-to-pin timing arcs on power consumption. To facilitate back annotation, "Backannotation" 244 provides a mechanism to read the wire load information to engine 232.

The power information calculated by engine 232 is either sent to "PwG Display" 246 to be displayed in graphical format to the user, or it could be stored in "PwG Database" 248. From database 248, the information could be retrieved for post process analysis by analyzer "PwG Power Analyses" 250. Analyzer 250 may tell the user which region has more power than it should based on user specified threshold, where power is going within the circuit, the number of glitches, and the power associated with the glitches. With this information, the user knows where the problem areas are and may redesign the circuit accordingly.

The user may further designate analyzer 250 to analyze power behavior at certain times or for certain cell blocks only. Since the power data is stored in database 248, the user could change his/her designation to a different time or a different block, and analyzer 250 will be able to provide the analysis as requested by retrieving the corresponding data from database 248 for any simulation time. Under this arrangement, power calculation could be reconstructed without having to rerun the simulation. Furthermore, the analysis requested by the user could be sent to "PwG Reports" 252 to be displayed in textual form, or to display 246 to be displayed in graphical form. Display 246 has the capability of showing the hierarchical distribution of power within a designated cell block. Reporter 252 has the capability of reporting only power information related to certain times or cell blocks as specified by the user.

The power dissipation model used to predict power behavior according to the present invention is represented by the following equation:

$$P^{ss}(\tau,v,\phi) = P_0(\tau,v,\phi) + P_1(\tau,v,\phi)*1 + P_2(\tau,v,\phi)*r + P_3(\tau,v,\phi)*r*1 + P_4(\tau,v,\phi)*hd\ r^2 + P_5(\tau,v,\phi)*1^2 + P_6(\tau,v,\phi)*r*1^2 + P_7(\tau,v,\phi)*1*r^2 + P_8(\tau,v,\phi)*1^{2*}r^2$$

where SS indicates a baseline process (e.g., in this case slow-slow), r=input ramp, 1=external load and $P^{ss}$ is the power dissipated by the cell for each state-vector applied. The model is able to account for different types of anomalies in the power behavior of a cell as it folds in its power coefficients $\{P_0, P_1, P_2, P_3, P_4, P_5, P_6, P_7, P_8\}$ sensitivity to {temperature, voltage, process-corner}, as represented by the set $\{\tau,v,\phi\}$, respectively.

The power coefficients in the power dissipation model represent the power behavior as exhibited by a gate or logic cell. $P_0$ represents power consumed by the cell when the input slew-rate and the output load is zero. $P_1$ represents power consumed due to output load switching. $P_2$ represents power consumed as a function of input slew-rate, which incorporates a component of the short-circuit current effect. $P_4$ represents non-linear effects due to input-slew-rate, and $P_5$ represents non-linear effects due to external load switching. $P_3$, $P_6$, $P_7$, and $P_8$, collectively, represent non-linear effects due to interaction of the short-circuit current with the output load switching for the entire range of fast and slow regions for all types of single and multi-stage devices.

In sum, the power-coefficients can be viewed as "power-signatures" which has embedded within them a very detailed power dissipation behavior for various conditions of input slew-rate and output load for each state-vector. These power signatures are used during DC-initialization phase of the PowerGate simulator to take into account instance-specific dependencies that include accounting for back-annotation and loading as seen by each port of each cell instance in the circuit. Instead of modifying a vendor's libraries, these power-signatures are attached to each instance based on the instance's cell type, and the functionality and timing behavior of each cell is inherited.

Since the model is not dependent on a specific timing model, as it inherits the timing behavior of each cell, the vendors would not need to modify their timing models. In addition, all sophistications of the vendors' timing models are inherited as well. Redundancy is therefore avoided as the vendors' library data can be used as is without duplication of functionality and/or description. In addition, there is no power assumption based on classification. Hence, the need for distinguishing between single-stage and multi-stage cells is eliminated as all cells are pre-characterized for the entire range of input ramps, output loads, and state-vectors.

Figure 8:
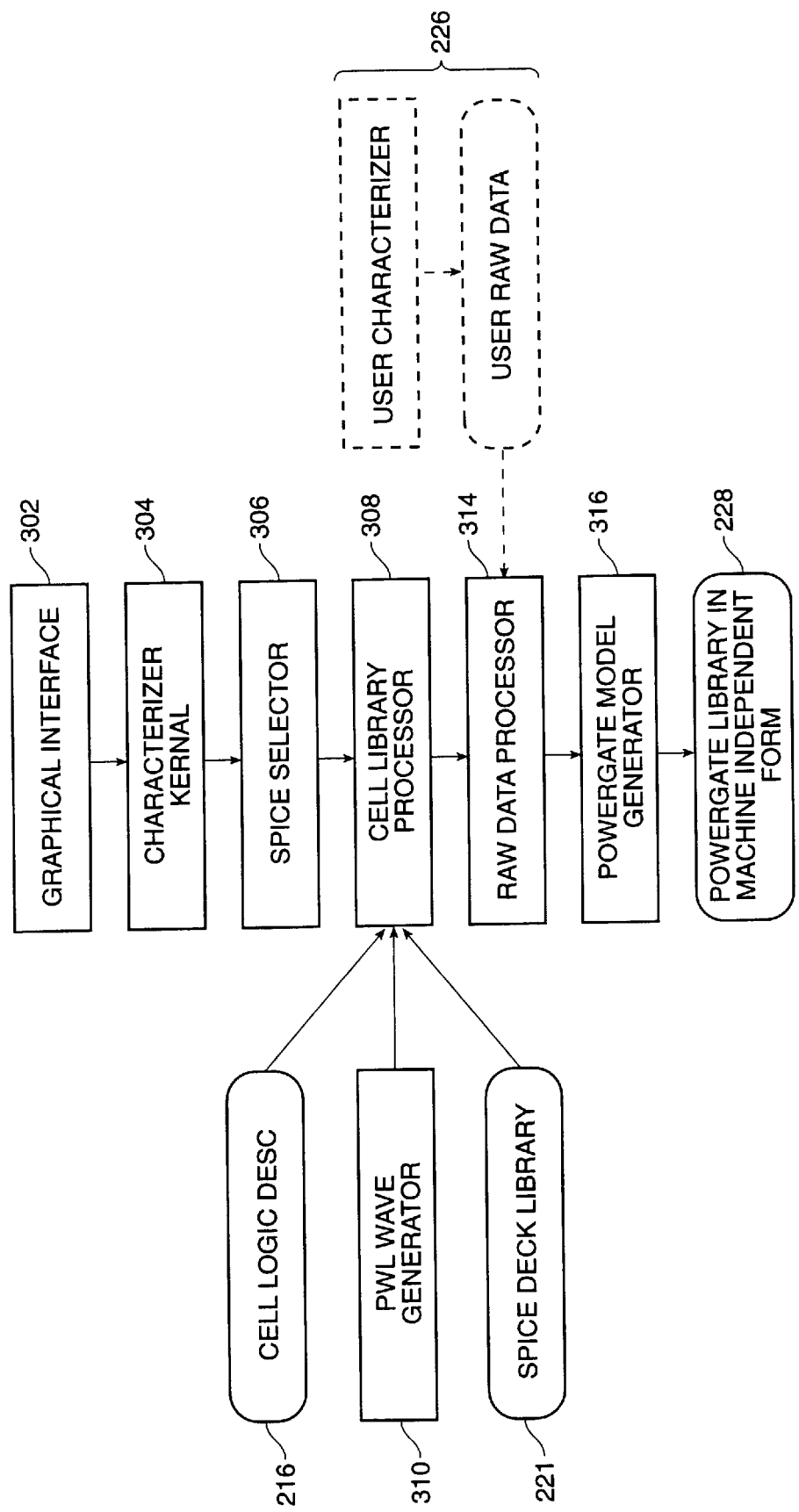
FIG. 8 is a flowchart illustrating the architecture of the characterizer according to the present invention.

FIG. 8 is a flowchart illustrating the architecture of characterizer 218. As mentioned, characterizer 218 considers the transistor-level description of each cell as derived from the cell layout (so as to include actual parasitic effects), and extracts power behavior for various circuit conditions that a cell can be subjected to during circuit operation. These circuit conditions include both static and dynamic phenomena which impact power dissipation as a function of input ramp, output load and state-dependencies. The technology, operational temperature, voltage, and fabrication process are also taken into account by characterizer 218. Experimentation has shown that full characterization of cells can be very time-consuming. For example, to characterize a flip-flop cell 1, it takes about 16 hours to characterize by full simulation. The issue of excessive simulation times involved in characterization is addressed by characterizer 218 as it implements a novel approach in reducing the characterization time without compromising accuracy.

The PowerGate characterizer is designed to implement both centralized and distributed models. In the centralized model, only one workstation is used for characterizing power. To reduce the characterization time, the number of points at which measurements are made for each state-vector is reduced. In addition, a full coverage of input ramp, output-loads, state-dependencies, and various types of anomalies that characterizer 218 is equipped to recognize and take appropriate steps to handle has also been devised. To facilitate this efficiently, characterizer 218 supplies power information to the power simulator via a rich set of procedural interface functions specifically developed for this purpose. For cells that still require a long time to characterize, the system has incremental processing capability, thereby allowing the user to save and later restore the characterized data, and proceed directly to characterize the remaining un-characterized cells. For the distributed model, which utilizes more than one workstation, a dramatic reduction in characterization time can be achieved if the workstations in the user's environment are run in parallel to characterize a cell library.

Characterizer 218 is flexible as it emphasize ease of customization and expandability rather than attempt to satisfy each and every user's requirements. The ease of customization is built-in to support multiple characterization methods, and multiple transistor-level simulators. In designing Characterizer 218, the need for different approaches to measure and model the power behavior of each cell/block of different circuits at different levels of abstraction was accounted for. Hence, characterizing can be performed for a wide variety of applications.

This wide applicability is further helped by the use of a procedural interface. With its use, it is easy to add new characterization algorithm to characterize cells beyond gate level such as memory blocks, macro-cells, megafunctions, etc. An existing tool-command language (preferably Python, a public domain software package) has also been embedded into characterizer 218 for controlling and extending the application. For example, the characterizer graphical user-interface is preferably developed in Python, to which additional power constructs have been added to facilitate description of the power behavior.

Referring to FIG. 8, characterizer graphical user interface 302 provides a netlist browser to enable a user to navigate netlists in the cell library. Graphical user interface 302 also allows users to set the run environment (by filling up forms), submit jobs (by selecting menus or buttons), and view graphical results. Characterizer Kernal 304 is in charge of dispatching and controlling sub-tasks. In addition, it also interprets Python commands, sets up the running environment according to user specification, and installs commands and user scripts. "Spice Selector" 306 provides the necessary support to facilitate user selection of the SPICE simulator of their choice. "Cell Library Processor" 308 and "PWL Wave Generator" 310 obtain information relating to the cell's functionality in the form of boolean operation or state-table for sequential gates from "Cell Logic Desc" 216, and automatically generate analog waveforms that create a desired state-vector from the information.

Processor 308 further combines the stimulus with a cell netlist obtained from "SPICE deck library" 221, issues measurement commands, runs SPICE simulator, and collects raw-data pertaining to power behavior. "Raw Data Processor" 314 reads data from "Cell Library Processor" 308, and supply the data to "PowerGate Model Generator" 316. "PowerGate Model Generator" 316 derives power-model by regression analyses, makes provisions to handle anomalous power behavior, generates power-objects, compiles the power-objects into machine-independent format, and builds a library of machine independent power-objects by storing the power-objects in "PowerGate Library in Machine Independent form" 228. In the alternative, as previously discussed, a user can provide power data (collectively shown as 226 in FIG. 8) to processor 314 by running their own characterizer and providing the measured data to processor 314. PowerGate internally generates the measured data in the EPL format (which is an ASCII format) before submitting it to generator 316 to create the power-object library.

Figure 9:
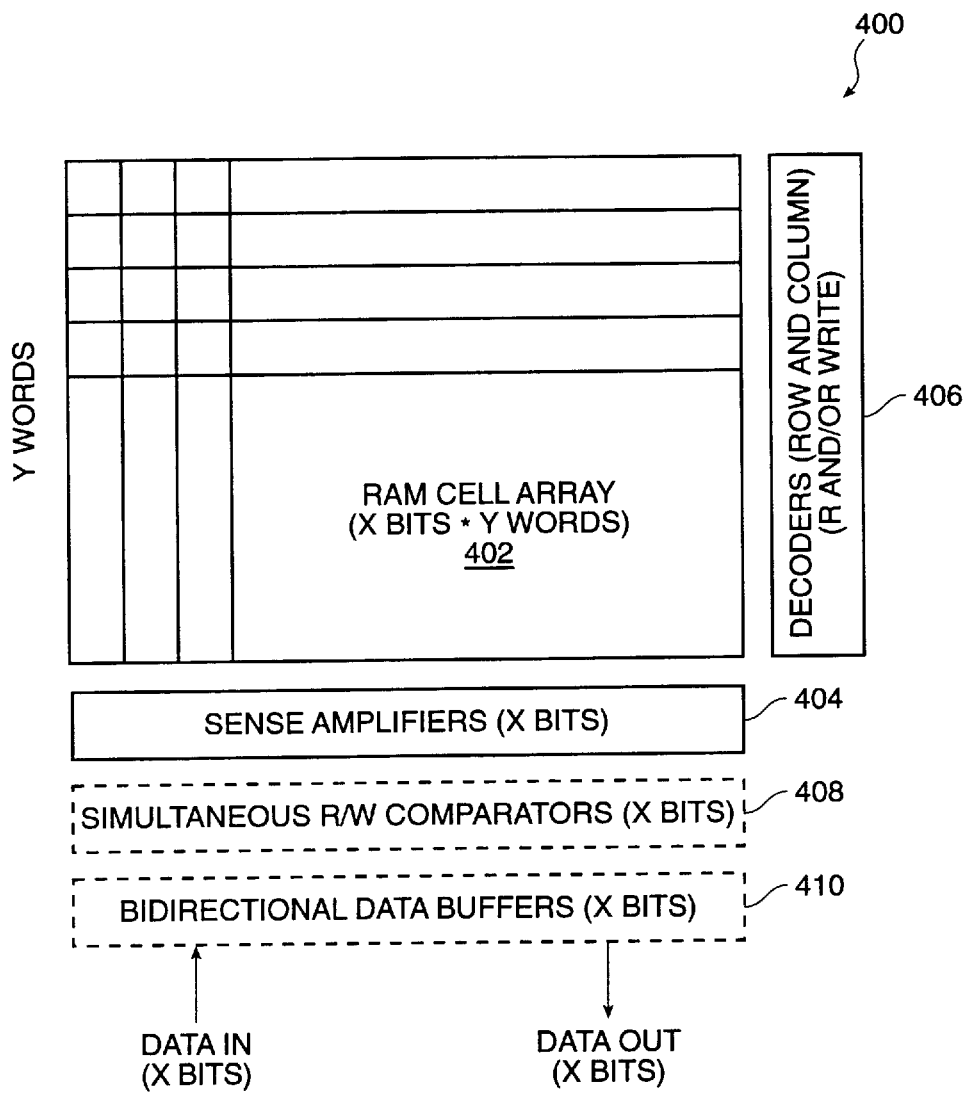
FIG. 9 shows the basic memory components of a memory block, whose power consumption can be modeled, characterized, and simulated according to the present invention.

The PowerGate characterizer further has the capability of modeling and characterizing power consumption by a memory block (MB), which has its basic memory components shown in FIG. 9. As shown, MB 400 contains X * Y Ram Cells Array (RCA) 402. Generally, it is desirable that the transistors in each cell in RCA 402 be as small as possible, since analog parts such as sense-amplifiers 404 consume a lot of power, and the size of sense-amplifiers 404 are proportional to the number of words. In MB 400, RCA 402 consumes about 5% of the total power. 70% of total power is consumed by sense amplifiers 404, decoder logic 406, muxes etc., and about 25% is consumed by control logic, pre-decoders, etc.

PowerGate develops the power consumption model of MB 400 based on an understanding of how memories function. The power dissipation of MB 400, which is of a given architecture and control logic, is characterized, and the significant impact of the memory block architecture on memory block power consumption is taken into account. For example, decoders 406, which are used to read and write a particular address, may involve read/write of particular bytes, not just an entire word. Other architectures may involve separate ROW and COLUMN decoders, or there may be separate read and write decoders. Some architectures demand additional comparators, such as simultaneous R/W comparators 408, to support simultaneous reading and writing of the same address location, and to bypass the read operation by outputting the input data direction on the output data bus. Bidirectional buffers 410 may also be necessary in case the memory architecture uses the same data bus for read and write data port. An additional row (not shown) may be needed if simultaneous read/write operations are permitted. This additional row will also have its impact on the power dissipated by MB 400.

PowerGate models the static and dynamic power consumption in memories by characterizing the various events (represented as state vectors) that may occur in a memory block (of given architecture and size) for their power consumption. These state-vectors are recognized during simulation and power consumption is calculated accordingly. These state-vectors are for static DC, precharge state, standby mode, read and write data, address and column decoding modes. The logic states of the bits are taken into account during read and write operations. Because the memory blocks can be large, PowerGate uses fast transistor-level simulators such as PowerMill for characterizing each memory block. The states PowerGate characterizes are as follows:

state0: PRECHARGE: Ipc
Usually a constant current.

state1: READING
READING is a row operation, and the power consumed is given by $$N_{re}*dI_{re}+N_{fe}*dI_{fe}+P_{offset}$$

where $P_{offset}$=power measured when the same bit is read i.e., bit state is unchanged;

$N_{re}$=number of bits undergoing rising edge;

$N_{fe}$=number of bits undergoing falling edge;

$dI_{re}$=averaged current increment consumed on rising edge;

$dI_{fe}$=averaged current increment consumed on falling edge; and $$N_{row,re}*I_{row,re}+N_{row,fe}*I_{row,fe}+N_{col,re}*I_{col,re}+N_{col,fe}*I_{col,fe}$$

where $N_{row,re}$=number of address bits for row undergoing rising edge;

$N_{row,fe}$=number of address bits for row in falling transition;

$I_{row,re}$=current dissipated for one address decode with rising edge; and $I_{row,fe}$=current dissipated for one address decode with falling edge.

Note: The power consumed by a column is modeled in a similar manner.

state2: WRITE
The power consumed is given by $$N_{re}*dI_{re}+N_{fe}*dI_{fe}+P_{offset}$$

where $P_{offset}$=power measured when the same bit is written i.e., D bit doesn't change;

$N_{re}$=number of D-bits undergoing rising edge;

$N_{fe}$=number of D-bits undergoing falling edge;

$dI_{re}$=averaged current increment consumed when the corresponding D bit has rising edge;

$dI_{fe}$=averaged current increment consumed when the corresponding D bit has falling edge.

Figure 10:
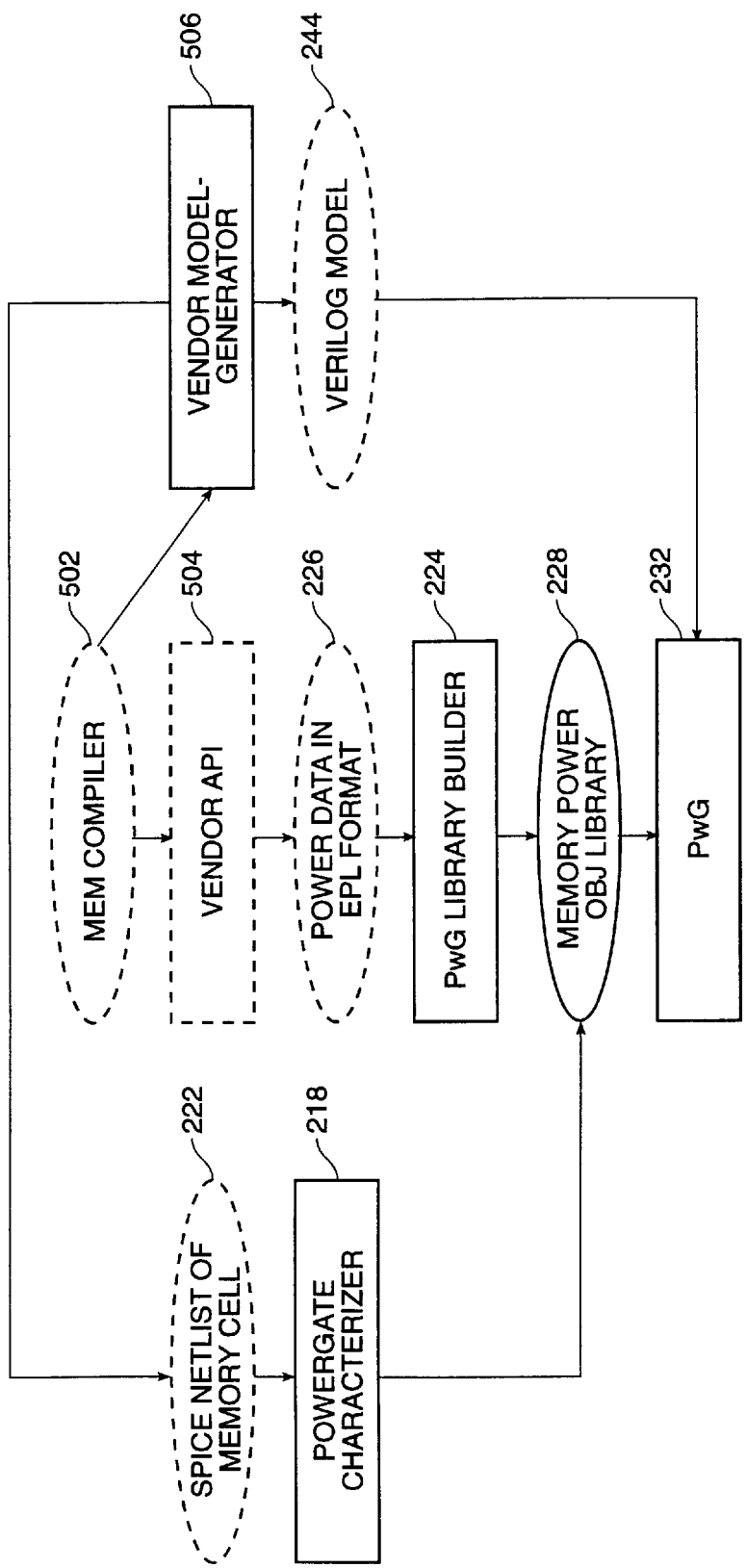
FIG. 10 is a flowchart illustrating the data flow in modeling, characterizing, and simulating power behavior in a memory block according to the method of the present invention.

FIG. 10 illustrates a typical data flow in the modeling, characterization, and simulation of power behavior in a memory block. Comparing FIGS. 7 and 10, it can be seen that FIG. 10 is a specific version of FIG. 7, as applied to modeling, characterization, and simulation of power consumption by MB 400. As indicated by the dotted lines, "Memory Compiler" 502, "Vendor API" 504, "Vendor-Model Generator" 506 are user invoked functions. "Memory Compiler" 502 is an ASIC Vendor tool run by the vendor to create memory blocks of specified architecture and size. After the vendor has specified the size and architecture of the particular memory block, "Vendor API" 504 (a procedural interface) extracts information, in EPL format, from the memory compiler files. Any characterized data pertinent to the power behavior of the particular memory block is specified here, as shown by "Power Data in EPL format" 226. "Vendor-Model Generator" 506 is used by the vendor to create SPICE netlist 222 and Verilog model 244 of the memory block. "PwG Library Builder" 224, as mentioned, obtains the raw data and converts the data into memory power-objects, which are stored in "Memory Power Obj Library" 228. "PwG" 232 is the simulator engine that estimates power consumption behavior of the memory block.

In simulating power behavior, PowerGate also takes into account glitches. A glitch may be external or internal. Internal glitches occur within the internal nodes of a cell, while external glitches occur on the interconnect wire, and is generally due to timing difference between the signals. Here, an external glitch implies a pair of two or more colliding output waveforms, which are so close together that the resultant output waveform may not reach either the high threshold voltage or the low threshold voltage. For both external and internal glitches, if the glitch peak voltage does not reach either threshold voltages, this is known as a partial voltage swing. A full voltage swing occurs when the glitch peak voltage reaches the high threshold voltage, i.e., the glitch peak voltage is considered to have reached Vdd. Since the PowerGate characterization takes into account power dissipated by internal and external glitches (of both partial and full voltage swings), it models all short-circuit charges that result from the glitches.

A transition on a cell port can result in glitches at internal nodes of the cell. The short circuit current effect arising from these glitches has an impact on power dissipation, which PowerGate characterization takes into account exactly. In addition, glitches can be generated by multiple events on the same cell, causing glitches to appear on the output due to timing hazards. These glitches can propagate to other cells, which in turn can cause secondary glitches at internal nodes of the cells, leading to further power loss. PowerGate determines the power loss into generated and propagated glitches based on its glitch model, which is derived from the characterization study of power loss as a function of input skew. The determination of power loss based on input skew will be further discussed.

An external glitch may exhibit different power behavior as a result of influence from internal node glitching. PowerGate characterizes glitches at internal nodes of the cell using transistor level description of the cell for each state-vector and under different conditions of input ramp and output load, thereby accounting for power behavior due to internal node glitching. The influence of external glitches on short-circuit behavior depends on the glitch voltage and the input skew. During the glitch operation, the output voltage does not significantly change i.e., the short-circuit current is not limited by charging/discharging of the output load, and hence could be higher than glitch-free cases. In addition, a glitch driving an input-pin of a consecutive gate might be propagated. In this case, the short-circuit charge might be higher than for two complete transitions at the input-pin.

Power consumption due to both external and internal glitches are typically not well accounted for, as existing digital simulators treat every voltage transition as a full-swing transition. In real circuits, partial swing transitions may also occur, and though they also consume power, they are undetected during logic simulation. As mentioned, PowerGate characterizes glitches at internal nodes of the cell for each state-vector and under different conditions of input ramp and output load, thereby accounting for power behavior due to internal node glitching. To characterize power loss into partial voltage swings by external glitches, PowerGate characterizes external glitch power as a function of skew between inputs. This glitch-power was found to be non-negligible even for values of skew that are much smaller than the propagation delay. For example, two events at the input may not propagate any event on the output (i.e., skew<0), which means output is unaffected. However, power may still be consumed in charging the internal capacitances. Since the distribution of the arrival times of signals at the input of a gate determines the skew values, glitch power dissipation depends on signal timing distribution. Hence, during simulation, PowerGate monitors the time difference between two signals charging at the inputs. Power dissipation is thus based on the characterized data which calibrates power loss as a function of input skew.

As mentioned, PowerGate models voltage waveform with glitches for both full and partial voltage swings. Generally, full voltage swing glitches occur when two successive full-swing state transitions overlap. The glitch-current consumed is modeled by the peak ratio Vz/ (Vdd−Vss), where Vz=glitch peak, and (Vdd−Vss)=full-swing. In PowerGate this is approximated by the ratio of $\Delta\tau/T$, where $\Delta\tau$=duration of glitch, and T=rise/fall propagation arc. The power loss into partial voltage swings is characterized as a function of the input skew $\tau$ i.e., $P(\tau,\rho,\lambda)$, where $\rho$=input-ramp, and $\lambda$=output-load. $P(\tau,\rho,\lambda)$ is used to derive power loss into partial voltage swings by modulating the glitch-free power dissipation per state-vector.

After a chip designer reviews the output of the power system of the present invention, the chip designer may utilize well known design techniques to reduce on chip power consumption. Accordingly, the present invention may be utilized to produce low power consuming chips. Additionally, the simulation result can aid the designer in predicting battery and chip life, selecting proper packaging, compensating for thermal effects, and the like.

III. Comparison of HSPICE, Verilog, and Powergate

It is well known that HSPICE provides accurate calculation of on-chip power consumption. However, HSPICE memory and CPU time becomes prohibitive (as compared to Verilog) as circuits increase to sizes having more than 10K transistors. HSPICE runs on a circuit description which consists of transistors. The energy dissipated is measured by averaging the Vdd current over some integration interval, and Vdd current is determined by directly solving the transistor equations. Direct solution of equations is cpu-intensive, requiring about 1000 bytes per transistor which puts constraints on the available memory. Although accuracy is achieved, speed and memory are compromised. This means that large circuits, as those encountered in deep sub-micron designs, cannot be effectively handled.

PowerGate, on the other hand, achieves SPICE-like accuracy without compromising speed and memory requirements. It is, therefore, particularly suitable for analyzing highly dense circuits. PowerGate achieves efficiency by working on a netlist at gate level. Each gate can consist of several transistors, but in the PowerGate netlist, all these transistors are grouped into a gate. Representation of each transistor requires about 1000 bytes of memory. Representation of a gate, which encompasses all these transistors, requires about 100 bytes of memory. Hence, PowerGate is more efficient as its memory requirement is greatly reduced. Finally, PowerGate utilizes a digital simulator, which is event-driven, and therefore, comparatively very efficient.

PowerGate achieves SPICE-like accuracy by using its own power dissipation model to characterize the power behavior of each cell. PowerGate's power dissipation model accounts for all kinds of anomalies exhibited by a cell as a function of ramp and load for different state vectors. The model is also parameterized to reflect the impact of instance-specific circuit conditions on power-estimation. During characterization, which is a separate process, each cell is considered at the transistor level, and the transistor models used incorporate highly non-linear deep sub-micron effects. Furthermore, all parasitic effects are included. Hence, the power object generated for each cell yields results close to SPICE predictions.

FIG. 11 is a chart comparing the accuracy and efficiency of PowerGate and HSPICE. As can be seen, HSPICE required 167.10 seconds to calculate power consumption of an asynchronous counter, a relatively small part of a circuit, while PowerGate took 0.9 seconds. Furthermore, PowerGate's results are within 1.1 percent of HSPICE. These results are typical of other cells and circuits. For example, simulation of a 230K gate circuit using HSPICE will require over several hundred gigabytes of memory and will take several days to complete, while the same simulation using PowerGate requires around 13 megabytes of memory and about 90 minute to complete. Hence, PowerGate is able to achieve significantly greater efficiency than HSPICE without compromising accuracy.

Verilog is well known for its speed, however, Verilog does not calculate power consumption values. PowerGate's effectiveness as a tool can be further seen from FIG. 12, which illustrates in a table the comparable simulation run-time, and the memory and disk space requirement for PowerGate and Verilog. FIG. 12 shows that PowerGate is very close to Verilog in speed performance, though it has the additional burden of calculating power consumption values. As shown in FIG. 11, PowerGate yields accuracy close to HSPICE. FIG. 12 does not show similar numbers for HSPICE, because for large circuits such as those used in the benchmark study (e.g. PAC4, PAC3, IIR2, Floating-Point Multiplier, etc.), HSPICE will take several days to run, if it converges at all. Furthermore, as previously mentioned, HSPICE has a prohibitive memory requirement for circuits of such sizes. In sum, while PowerGate has the accuracy of HSPICE, it also has the efficient speed, memory and disk space requirement of Verilog.

Referring to FIG. 12, the first column of the table labels the circuit, and the second column gives the number of equivalent gates in the circuit. Each equivalent gate equals 4 transistors, so a circuit such as PAC4 involves about a million transistors. The "#Events" column gives the number of events in the circuit as caused by the vectors in column "Vec". Pure Verilog means no dumping of logic data variables. Dumping usually cause more I/O time. VCD stands for "Value Change Dump". The time, memory usage, and disk space required when these circuits are run in Verilog with or without VCD have been measured. The time, memory, and disk required by pure Verilog, and Verilog with logic data variables dumped and stored in VCD file are shown. To show that PowerGate has comparable speed, memory and disk requirement as Verilog (though it performs power consumption calculation and Verilog doesn't), PowerGate is run by dumping equivalent number of power data variables.

As shown, PowerGate runs almost as efficiently as Verilog (compare columns 5 & 10). Performance degradation in PowerGate is much less than Verilog when variables are dumped (compare columns 13 & 14). The memory requirements of PowerGate are also less than that of Verilog for the same circuit (see columns 8 & 11). Moreover, since PowerGate dumped variable data is in binary form (which is greatly optimized as compared to VCD file which is ASCII), the disk space requirement of PowerGate is much less than Verilog (compare columns 12 & 9).

The above description is illustrative and not restrictive. Variations of the invention will become apparent to those skilled in the art upon review of this disclosure. Merely by way of example, while the invention is illustrated with particular reference to HSPICE as a transistor level simulator, other simulators such as PowerMill may also be used. The scope of the invention should, therefore, be determined not with reference to the above description, but instead should be determined with reference to the appended claims along with their full scope of equivalents.

What is claimed is:

1. In a programmed computer, a method of predicting power behavior of a circuit, said method comprising the steps of:

providing data for calculating power in a block;

generating a power object for said block by condensing said data according to a power dissipation model; and simulating functional behavior for said block and calculating from said functional behavior actual power consumed by said block within said circuit from said power object, wherein said actual power includes effects of output load switching.

2. The method of claim 1, wherein said providing step further comprising the steps of:

deriving a transistor netlist for said block based on said block's layout using actual interconnect capacitances;

generating analog waveforms to create desired states on said block;

measuring energy dissipated for an applied state-vector at a given set of ramp and load;

repeating said measuring step for the entire range of ramp and load values allowed by the technology of the library to which said block belongs; and determining power coefficients by measuring the different ramp and load conditions for each state-vector of said block.

3. The method of claim 2, wherein said block comprises a cell.

4. The method of claim 1, wherein said block comprises a memory block having memory components.

5. The method of claim 1, wherein said power object further comprises a mechanism for matching resultant logic state-vectors with characterized state-vectors and logic attributes of said block.

6. The method of claim 1, wherein said power dissipation model accounts for non-linear power behavior of said block under different circuit conditions by generating temperature, voltage, and process corner sensitive power coefficients for each state vector of said block, and factoring in the effect of input ramp and external load on the power behavior of said block.

7. The method of claim 1 further comprising the step of monitoring input skew to account for power dissipation due to glitches.

8. The method of claim 7 wherein said power dissipation due to glitches include glitch voltage of partial voltage swings, and glitch voltage of full voltage swings.

9. The method of claim 1 further comprising the step of characterizing power behavior of said block using a power characterizer, wherein said power characterizer is compatible with different transistor level simulators; said characterizing step further comprising the steps of:

deriving a transistor netlist for said block based on said block's layout using actual interconnect capacitances;

generating analog waveforms to create desired states on said block;

measuring energy dissipated for an applied state-vector for the entire range of ramp and load values allowed by the technology of the library to which said block belongs;

determining power coefficients by measuring the different ramp and load conditions for each state-vector of said block; and storing said power coefficients in said power object to consolidate power-related data for said block.

10. The method of claim 9, wherein said characterizing step accounts for glitches within internal nodes of said block.

11. The method of claim 1 wherein said simulating step accounts for pin-to-pin timing arcs.

12. In a programmed computer, a method of predicting power behavior of a circuit, said method comprising the steps of:

compiling logic and transistor level descriptions of a block;

running a transistor level simulator to generate power coefficients corresponding to each state vector that results from allowed combinations of logic-states on ports of said block;

consolidating said power coefficients into a power object;

comparing said power object with power information generated by a circuit simulator to verify accuracy of said power object;

creating a power object file in machine-independent format for each block in a library, so that said power object file is accessible on different types of platforms;

assigning a power object to each block based on the block-type name during loading of a circuit netlist, thereby allowing a block model library of a digital simulator to be used as is;

accessing said power object with a first procedural interface during power simulation;

calculating power consumption of said block within said circuit from said power object; and reporting said power consumption value calculated.

13. The method of claim 12 further comprising the steps of:

accessing said digital simulator with a second procedural interface, said digital simulator for processing events;

calculating and reporting power consumption of said block within said circuit from said power object after an event is generated; and repeating said calculating and reporting step after each scheduled event.

14. The method of claim 13 further comprising the step of varying said second procedural interface to ensure compatibility with different digital simulators.

15. The method of claim 12 wherein said reporting step further comprises displaying said power consumption value in graphical form, and showing a hierarchical distribution of power dissipation.

16. The method of claim 12 wherein said reporting step further comprising the steps of:

storing said power consumption value in a database for future retrieval, thereby eliminating recalculation of said power consumption value;

retrieving said power consumption value from said database to analyze power behavior for any simulation time; and presenting said power behavior analysis.

17. The method of claim 16 wherein said presenting step further comprises displaying said power behavior analysis in graphical form, and showing a hierarchical distribution of power dissipation.

18. The method of claim 16 wherein said presenting step further comprises organizing and presenting said power behavior analysis in text form.

19. The method of claim 12 wherein said calculating step may be performed for a pre-layout phase and a post-layout phase, wherein power calculation for said post-layout phase will take into account back annotation by calculating power consumption based on the actual length of the interconnect wire.

20. A method for modeling power dissipation, said method accounts for non-linear power behavior of cells under different circuit conditions, said method comprising the steps of:

generating power coefficients according to a non-linear power dissipation model for each state vector of a cell factoring in temperature, voltage, and process corner characteristics in said power coefficients; and factoring in the effect of input ramp and external load on the power behavior of said cell.

* * * * *